UNITED STATES PATENT OFFICE.

CARLETON ELLIS, OF MONTCLAIR, NEW JERSEY.

PROCESS OF MAKING A CATALYST.

1,251,203.   Specification of Letters Patent.   Patented Dec. 25, 1917.

No Drawing.   Application filed January 25, 1917.   Serial No. 144,379.

*To all whom it may concern:*

Be it known that I, CARLETON ELLIS, a citizen of the United States, residing at Montclair, in the county of Essex and State of New Jersey, have invented certain new and useful Improvements in Processes of Making Catalysts, of which the following is a specification.

The present invention relates to the production of catalysts suitable for the hydrogenation of oils or the like, by the reduction or decomposition of salts of the catalytic metal with readily volatile or readily decomposable acids, an example of such acids being acetic. This class of acids includes such acids as the lower members of the fatty acid series, and some others. Various metallo-organic compounds consisting of a metal united to a weak organic acid are included herein.

As an example of the process, to which the present application is not limited, I cite the production of a nickel and charcoal composition.

In preparing the charcoal for use I preferably ignite a good grade of charcoal to expel any gases which may have been absorbed. It is desirable to remove all air from the pores of the charcoal and therefore, after the charcoal has been ignited and before it is cooled, I preferably pass through the mass a gentle current of hydrogen gas. Prior to such ignition, the charcoal may be treated with a solution containing a metallic salt, the metal of which acts as a catalyzer and during such ignition the metal compound may be thus reduced, to precipitate the metal catalyst and to thereby coat the charcoal with a metallic catalyzing body. To this end, ignition in hydrogen should preferably be carefully controlled as regards temperature, because metallic catalyzers are rather sensitive to excessive heating and oftentimes lose entirely, their effectiveness, if overheated.

I prefer not to impregnate the charcoal too deeply with such a catalyzer agent of a metallic character, but instead preferably treat the material so as to have merely a thin or substantially superficial layer of the metallic catalyzer on the charcoal support. This may be accomplished by dipping the charcoal in a strong solution of the metallic salt, removing quickly and quickly drying, thus incrusting the surface or superficial portion of the charcoal mass with the metallic salt.

Nickel may be applied to the charcoal surface using such salts as nickel acetate and the like. This can then be reduced by heating in a current of hydrogen, at a relatively low temperature, a temperature of 250–350° C. being suitable.

It is preferable to employ nickel salts of high purity, since certain impurities, even if present in only very small amounts would be highly disadvantageous, chlorids for example, even if present in only very small amounts, being highly inimical to the catalytic activity of the nickel.

This application is in part a continuation of my application 686,988, filed March 29, 1912, renewed September 11, 1916 as Number 119,408, which application contains matter continued from my prior application 679,771, filed Feb. 12, 1912. Said two applications have now matured into Patents 1,217,118 and 1,174,245 respectively.

What I claim is:

1. A process of making a catalyst which comprises reducing nickel acetate with a hydrogen-containing gas.

2. A process of making a catalyst which comprises reducing a nickel salt of a lower fatty acid with a reducing gas.

3. A process of making a hydrogenating catalyst which comprises reducing by heating with a reducing agent, a salt of high purity of a metal which in the free state possesses catalytic activity united to a fatty acid.

4. A process of making a hydrogenating catalyst adapted to effectively add hydrogen to unsaturated oily bodies which comprises reducing a nickel salt of high purity of a weak volatile organic acid.

5. A process of making a hydrogenating catalyst adapted to effectively add hydrogen to unsaturated oily bodies which comprises reducing a substantially chlorin-free salt of a weak volatile organic acid.

6. A process of making a hydrogenating catalyst which comprises reducing by heating with a reducing agent, a chlorin-free, organic acid salt of high purity of a metal which in the free state possesses catalytic activity.

7. A process which comprises treating charcoal with a chlorin-free solution of nickel acetate, drying, and thereafter heating the so treated charcoal in a reducing atmosphere to a temperature sufficient to reduce said acetate to nickel.

8. A process which comprises treating charcoal with a solution of an organic acid salt of a metal capable of acting as a catalyst, and thereafter heating the charcoal, in a reducing atmosphere, sufficient to reduce the said salt.

In testimony whereof I affix my signature.

CARLETON ELLIS.